US012267423B2

(12) United States Patent
Durham et al.

(10) Patent No.: US 12,267,423 B2
(45) Date of Patent: Apr. 1, 2025

(54) SEAMLESS ACCESS TO TRUSTED DOMAIN PROTECTED MEMORY BY VIRTUAL MACHINE MANAGER USING TRANSFORMER KEY IDENTIFIER

(71) Applicant: Intel Corporation, Santa Clara, CA (US)

(72) Inventors: David M. Durham, Beaverton, OR (US); Siddhartha Chhabra, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 601 days.

(21) Appl. No.: 17/485,146

(22) Filed: Sep. 24, 2021

(65) Prior Publication Data
US 2022/0014356 A1 Jan. 13, 2022

(51) Int. Cl.
*H04L 29/06* (2006.01)
*G06F 9/455* (2018.01)
*H04L 9/08* (2006.01)

(52) U.S. Cl.
CPC .......... *H04L 9/088* (2013.01); *G06F 9/45558* (2013.01); *G06F 2009/45587* (2013.01)

(58) Field of Classification Search
CPC ............................ H04L 9/088; G06F 9/45558
See application file for complete search history.

(56) References Cited

U.S. PATENT DOCUMENTS

| 2015/0271152 | A1  | 9/2015 | Lie et al. |
| 2020/0057664 | A1* | 2/2020 | Durham ................. G06F 21/53 |
| 2021/0006395 | A1  | 1/2021 | Durham et al. |
| 2021/0173685 | A1  | 6/2021 | Tsirkin et al. |

OTHER PUBLICATIONS

EPO; Extended European Search Report issued in EP Patent Application No. 22184630.6, dated Dec. 15, 2022; 9 pages.

* cited by examiner

Primary Examiner — Jeffrey C Pwu
Assistant Examiner — Thong P Truong
(74) Attorney, Agent, or Firm — Alliance IP, LLC

(57) ABSTRACT

In one embodiment, an apparatus includes a processor comprising at least one core to execute instructions of a plurality of virtual machines (VMs) and a virtual machine monitor (VMM), and a cryptographic engine to protect data associated with the plurality of VMs through use of a plurality of private keys and a trusted transformer key, where each of the plurality of private keys are to protect program instructions and data of a respective VM and the trusted transformer key is to protect management structure data for the plurality of VMs. The processor is further to provide, to the VMM, read and write access to the management structure data through an untrusted transformer key.

22 Claims, 10 Drawing Sheets

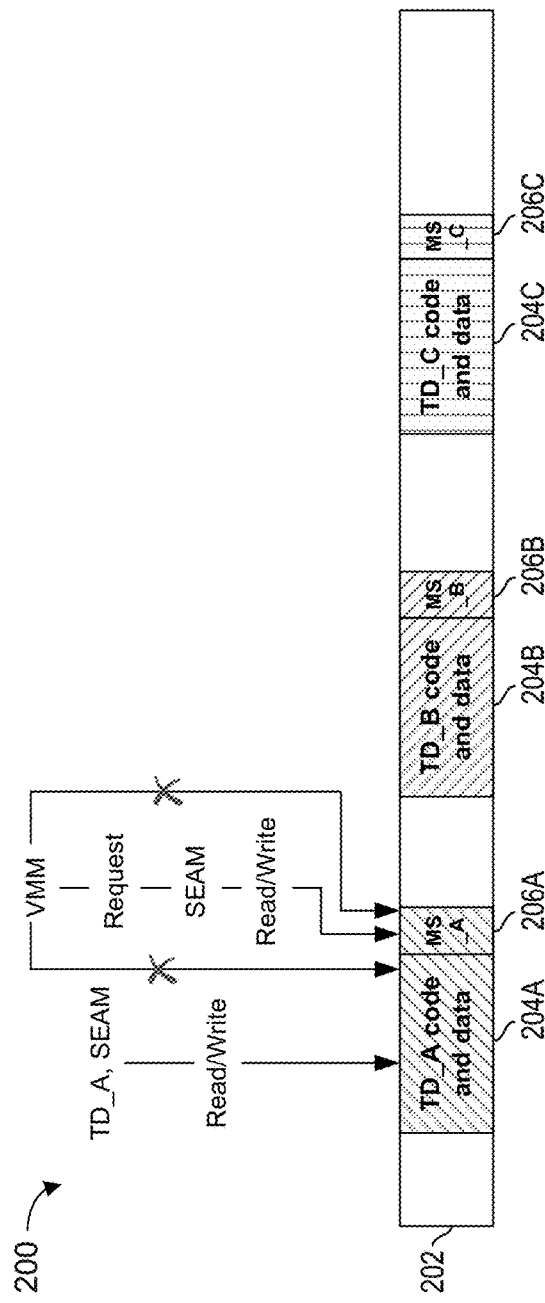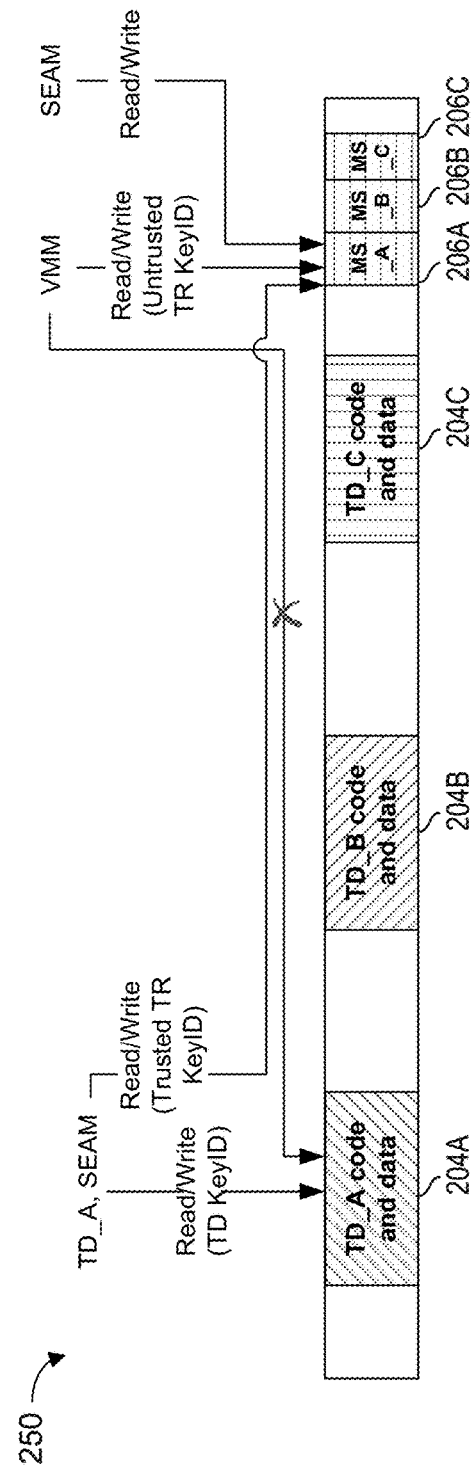
FIG. 2A
FIG. 2B

SEAMLESS ACCESS TO TRUSTED DOMAIN PROTECTED MEMORY BY VIRTUAL MACHINE MANAGER USING TRANSFORMER KEY IDENTIFIER

TECHNICAL FIELD

This disclosure relates in general to the field of computing systems and, more particularly, to data access and protection.

BACKGROUND

Protecting memory in computer systems from software bugs and security vulnerabilities is a significant concern. A malicious actor may attempt to access data which it is not authorized to access. Integrity protection and encryption are common ways to protect data stored in memory.

BRIEF DESCRIPTION OF THE DRAWINGS

FIGS. 2A-2B illustrate example architectures in which private trusted domain (TD) code and data are protected

Like reference numbers and designations in the various drawings indicate like elements.

DESCRIPTION OF EXAMPLE EMBODIMENTS

Figure 1:
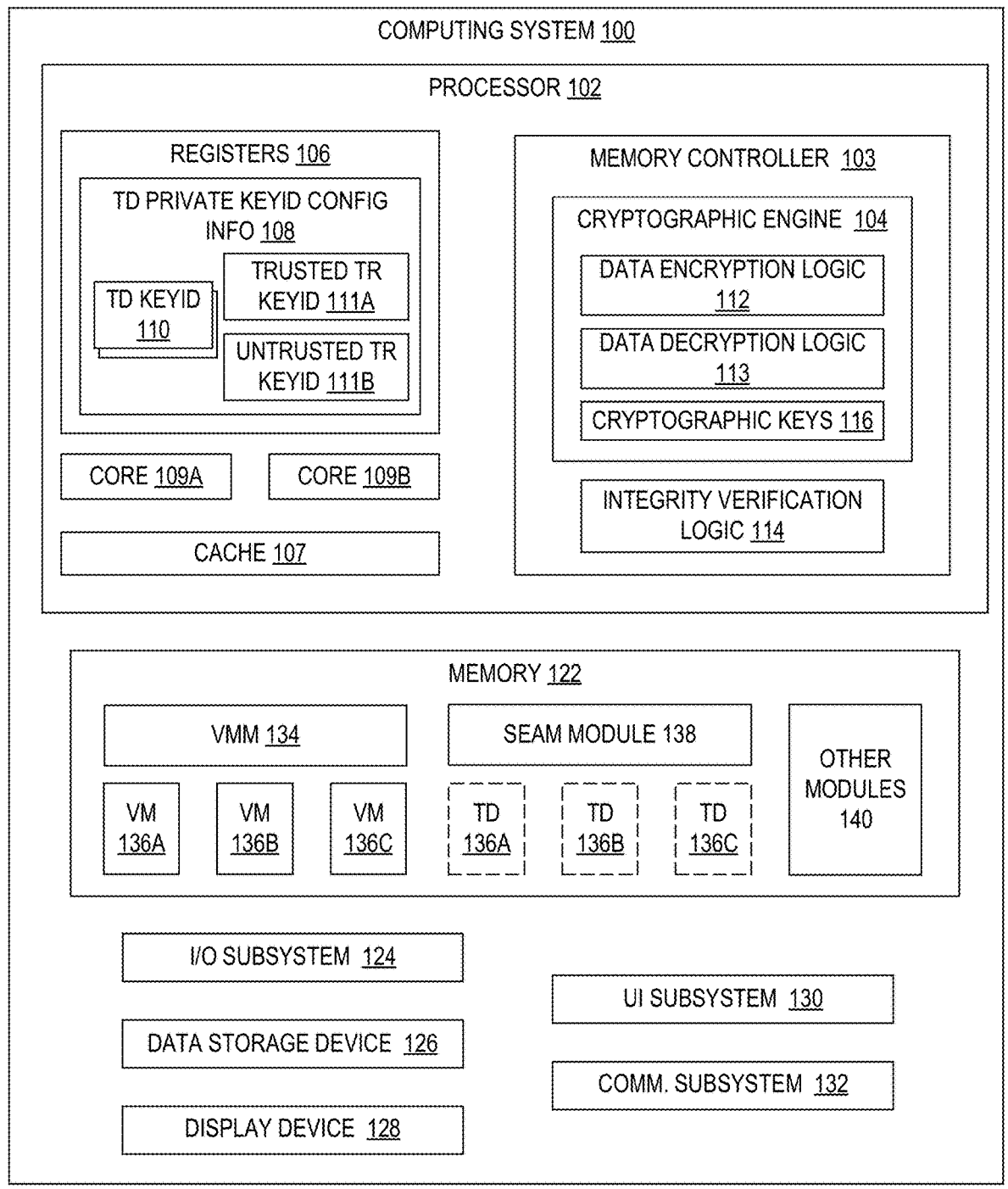
FIG. 1 illustrates a computing system in accordance with certain embodiments.

Cloud security providers (CSPs) may cryptographically isolate customer workloads running on their platforms from each other and from the CSP. In some current architectures, a platform may implement trust domain extensions (TDX) for providing cryptographic isolation on servers and removing CSP software (e.g., a virtual machine monitor (VMM)) from the trust boundary, so that it cannot access private data of the individual virtual machines (VMs) (where the trust boundary associated with a particular VM is referred to as a trusted domain (TD)). TDX may provide cryptographic isolation for customer workloads in a cloud environment using a multi-key total memory encryption engine (MKTME) which provides both confidentiality and integrity. Current architectures may also utilize a central processing unit (CPU) mode or other secure processor execution mode referred to as secure-arbitration mode (SEAM) root mode (also referred to herein as a SEAM mode) wherein a software module referred to herein as a SEAM module is executed by the CPU to implement VM isolation.

In current architectures, each VM (also referred to herein as a trusted domain (TD)), may be assigned its own unique memory encryption key such that the VMM and the other VMs do not have access to the plaintext memory of an encrypted VM (TD). Deterministic access prevention of a TD's private memory may be implemented using a metadata bit, known as the trusted domain (TD) bit which is set for data of writes originating from a TD and checked (e.g., by a cryptographic engine such as a MKTME engine) on read accesses. A read access originating from within a TD is allowed to access the data which will then be integrity verified (e.g., by the cryptographic engine) using the accessing TD's private key. When a read access for that data is requested by non-TD software (e.g., VMM) that is not authorized to read the data, poisoned data comprising fixed zeros (or other predetermined value) may be returned back to the software attempting to access the data. While these mechanisms provide the intended protections for TD's private memory to remove the VMM from the trust boundary, they may be overly limiting in that direct access to TD management structures (e.g., TD secure extended page tables (EPTs), nested page tables (NPTs), and page modification logs (PMLs)) is denied to the VMM even though the VMM needs read access to these structures for management functions. The VMM may instead be required to make a call (e.g., through a CPU instruction) to transition the CPU to the SEAM root mode and to have the SEAM module request access to these TD management structures in order to read the structures from memory. Such a call may be referred to as a SEAMCALL. The SEAM module may read the TD's private memory where the management structures are stored and copy and share the memory contents with the VMM at a specified location (e.g., within a shared memory region or via a register) accessible to the VMM. However, the call to the SEAM module may incur significant delays (e.g., thousands of CPU cycles) due to a processor mode switch.

In embodiments of the present disclosure, TDs may utilize respective unique Key identifiers (KeyIDs), referred to herein as a TD KeyIDs (e.g., 110), to write data to certain portions of memory, including private code and data as well as management structures for the TD. The TD KeyIDs may identify the unique encryption keys described above. In addition, embodiments herein may introduce special KeyIDs, referred to herein as transformer KeyIDs (e.g., 111A, 111B), that can be used in the SEAM mode and by the VMM (e.g., VMM 134) for both read and write accesses to the management structures of the TDs. A VMM write to memory using the transformer KeyID may result in a transfer of memory ownership to the VMM.

When a TD later attempts to access the data in the management structures using its KeyID (e.g., through a secure EPT page walk by the TD), the data may be returned with an indication that it was last written by the VMM using the transformer KeyID. A page miss handler (PMH) hardware, on receiving this indication, may fault to the SEAM module, which can then read the data from memory using the transformer KeyID. The SEAM module may verify and/or inspect the data (and any related structures that may have been modified) to ensure that the VMM operations are acceptable. If deemed acceptable, the SEAM module may write the data back to the memory location using the trusted transformer KeyID, and then the TD may be resumed and can access the memory using the trusted transformer KeyID without receiving a fault.

Using the transformer KeyID, the SEAM and VMM may seamlessly share some data through memory without having to transition processor modes which can require thousands of cycles. This can enable many usages, such as live migration, by allowing reads of private EPT structures, A/D bits, PML etc., EPT edits, avoiding shadow EPT management in the VMM while ensuring their integrity. Further, embodiments herein may still ensure that rest of the TD private memory is not explicitly shared by SEAM using the transformer KeyID is still protected from viewing/access by the VMM. In this way, the VMM can access structures such as TD EPTs and PMLs for management purposes while avoiding the processor mode transfer to SEAM each time such access is needed. The security properties required for TD data isolation are still maintained since private memory for a TD (e.g., code and data) can continue to use the TD private key which is still inaccessible to the VMM through the use of a TD bit in memory or through integrity. For instance, if the VMM uses a shared KeyID to access TD private code or data, it will be protected by a TD bit check, and if the VMM uses the untrusted transformer KeyID to access TD private code or data it will result in an integrity failure.

Embodiments herein can be implemented with only minimal changes to existing hardware and can allow for significantly easier software enabling (e.g., avoiding shadow EPT maintenance) for VM isolation in addition to the performance benefits of saving the mode switch through SEAM calls as well as the need for SEAM to maintain shadow structures. For instance, VMM logic need not need to change to implement embodiments herein. That is, the VMM may behave as it normally would, editing the management structures of the VMs it believes it manages, while being transparently monitored for security violations by the trusted SEAM module.

Referring to FIG. 1 in detail, the computing system 100 may be embodied as any type of electronic device for performing the functions described herein. For example, the computing system 100 may be embodied as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, and/or any other computing device configured to perform the functions described herein.

As shown in FIG. 1, an example computing system 100 includes at least one processor 102, memory 122, input/output subsystem 124, data storage device 126, display device 128, user interface (UI) subsystem 130, and communication subsystem 132. Although not shown, in various embodiments, computing system 100 may also include a graphics processing unit (GPU), which may also include a protected SEAM mode. In further embodiments, system 100 may include one or more hardware accelerators.

The computing system 100 may include other or additional components, such as those commonly found in mobile and/or stationary computers (e.g., various sensors and input/output devices), in other embodiments. Additionally, in some embodiments, one or more of the example components may be incorporated in, or otherwise form a portion of, another component. Each of the components of the computing system 100 may be embodied as software, firmware, hardware, or a combination of software and hardware.

Processor 102 includes memory controller 103, registers 106, cache 107, and one or more cores 109 (e.g., 109A and 109B). The processor 102 may be embodied as any type of processor capable of performing the functions described herein. For example, the processor 102 may be embodied as a single or multi-core central processing unit (CPU), a multiple-CPU processor, a processing/controlling circuit, or multiple diverse processing units or circuits (e.g., a CPU and a Graphic Processing Unit (GPU), etc.).

Registers 106 may include, e.g., general purpose registers, special purpose registers, and model specific registers (MSRs). In the embodiment depicted, registers 106 store TD private KeyID configuration information 108. The information 108 may include the TD private KeyIDs 110 as well as any suitable information about the TD private KeyIDs 110, such as the number of TD private KeyIDs available for use. In one example, information 108 may include a programmable (e.g., via a processor instruction) value that indicates the number of memory address bits that may be used to carry TD private KeyIDs 110 for memory read and write requests (and thus the maximum number of KeyIDs available for use to protect TDs, where in some embodiments each TD is protected with its own key identified by a KeyID). The information 108 may also include an identification of a transformer KeyID 111A or 111B (e.g., the information 108 may specify the particular value of the transformer KeyID 111A or 111B, which may be within the address space of the TD private KeyIDs or some other address space, or may specify a location of a transformer KeyID 111A or 111B).

Cryptographic engine 104 includes data encryption logic 112, data decryption logic 113, and cryptographic keys 116. Data encryption logic 112 is to encrypt data based on various cryptographic keys 116 and data decryption logic 113 is to decrypt data based on the cryptographic keys 116. Integrity verification logic 114 of the memory controller 103 provides integrity verification operations. For example, integrity verification logic 114 may calculate a message authentication code (MAC) for data written to memory 122 and may store the MAC with the data (e.g., in the same cacheline). When the memory address at which the data is stored is accessed via a read command, the integrity verification logic 114 may calculate a MAC based on the data read from memory 122 and compare the MAC against the MAC read from the memory 122 to determine whether the data accessed is the same as the data that was written to the memory address. If the MACs do not match, cryptographic engine 104 may perform one or more of: trigger a page fault (or other type of fault), set the value of the data returned for the access to a predetermined value (e.g., each bit may be set to zero), and mark the returned data as poisoned so it is not treated as valid data by the requesting entity. Responsive to a write request, the MAC may be calculated before encryption of the data, in conjunction with encryption of the data, after encryption of the data, or independent of encryption (e.g., the key may be used to generate the MAC if encryption is not used). Responsive to a read request the MAC may be calculated before decryption of the data, in conjunction with decryption of the data, after decryption of the data, or independent of encryption of the data (e.g., computed regardless of whether the data is encrypted or not).

Cryptographic keys 116 may comprise a plurality of TD private keys identified by the TD KeyIDs 110, a trusted transformer key identified by trusted transformer KeyID 111A, an untrusted transformer key identified by untrusted transformer KeyID 111B, and any other suitable keys, such as shared keys that may be used by the VMM to access data shared by VMs. In some embodiments, the shared KeyID space may be a different memory address space (e.g., may use different bits from the memory address space of the TD private keys).

In various embodiments, the cryptographic engine 104 may be an MKTME engine that uses a different cryptographic key 116 (or set of keys) for each VM 136 hosted by the system 100. In various embodiments, any suitable cryptographic or integrity protections (e.g., via MAC generation) may be implemented by the cryptographic engine 104. As just one example, the cryptographic engine 104 may provide cryptographic and confidentiality protection using Advanced Encryption Standard (AES) in xor-encrypt-xor-based tweaked-codebook mode with ciphertext stealing (XTS) mode and integrity protection using a SHA-3-based MAC for each integrity-protected cacheline written to memory 122. In some embodiments, MACs may be stored in ECC devices and read in parallel as error correcting codes may be stored in sequestered memory separately read/written corresponding to the data.

The CPU may indicate the TD bit in a memory request and the memory controller 103 may also set the TD bit for a write originated by a SEAM managed VM (TD) 136. In some embodiments, the TD bit is set on a per cacheline granularity (or other granularity consistent with a write instruction granularity). The TD bit may be set in association with use of a TD private KeyID specified (e.g., within address bits) by a write instruction and thus the VMM 134 may not access such cachelines. When read data includes a set TD bit, the cryptographic engine 104 may also check to ensure that the calling entity is authorized to access the data (e.g., by checking whether the KeyID is from a trusted entity or not, or the address of the calling instruction to determine if it is from an entity authorized to access the data). In some embodiments the read instruction may include the KeyID within address bits of the read instruction and the calling address of the instruction may be checked against the authorized address space for the particular KeyID to determine whether the access is being made by the associated TD.

The memory 122 of the computing system 100 may be embodied as any type of volatile or non-volatile memory or data storage (or combination of these) capable of performing the functions described herein. Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in memory is synchronous dynamic random access memory (SDRAM). In particular embodiments, DRAM of memory 122 complies with a standard promulgated by the Joint Electron Device Engineering Council (JEDEC), such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Non-volatile memory is a storage medium that does not require power to maintain the state of data stored by the medium. Nonlimiting examples of nonvolatile memory may include any or a combination of: solid state memory (such as planar or 3D NAND flash memory or NOR flash memory), 3D crosspoint memory, memory devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMS), and magnetic storage memory.

In some embodiments, memory 122 comprises one or more memory hardware modules, such as dual in-line memory modules (DIMMs). In some embodiments, the memory 122 may be located on one or more integrated circuit chips that are distinct from an integrated circuit chip comprising processor 102 or may be located on the same integrated circuit chip as the processor 102. Memory 122 may comprise any suitable type of memory and is not limited to a particular speed or technology of memory in various embodiments. Some embodiments may use ECC DIMMs that have additional chips and wiring for the purpose of error detection and correction, these additional memory devices may also be used to store the TD bit and integrity MAC values for each corresponding cacheline/memory line.

In operation, the memory 122 may store various data and software used during operation of the computing system 100, as well as operating systems, applications, programs, libraries, and drivers. Thus, memory 122 may store data and/or sequences of instructions that are executed by the processor 102. In the embodiment depicted, memory 122 stores information (e.g., program code, data, management structures, etc.) for a VMM 134, any number of TDs 136 (which correspond to VMs 136 that are managed through SEAM), a SEAM module 138, other VMs that are not managed through SEAM (not shown), and other modules 140.

Other modules 140 may include a number of computer program components, such as one or more user space applications or other applications. Any of these modules 140 may be embodied as any computer application (e.g., software, firmware, hardware, or a combination thereof). Some examples of other modules 140 include word processing programs, document viewers/readers, web browsers, electronic mail programs, messaging services, computer games, camera and video applications, etc. Some of these workloads may run in virtual machines individually encrypted and managed by SEAM to prevent direct access by the VMM.

VMM 134 (also known as a hypervisor) may comprise logic to create and run VMs 136. The VMM 134 may present guest operating systems run by VMs 136 with a virtual operating platform (e.g., it appears to the VMs that they are running on separate physical nodes when they are actually consolidated onto a single hardware platform) and manage the execution of the guest operating systems by system 100. Services of VMM 134 may be provided by virtualizing in software or through hardware assisted resources that require minimal software intervention, or both. Multiple instances of a variety of guest operating systems may be managed by the VMM 134.

VMM 134 may be a native or bare-metal hypervisor that runs directly on system 100 to control the system logic and manage the guest operating systems. Alternatively, VMM 134 may be a hosted hypervisor that runs on a host operating system and abstracts the guest operating systems from the host operating system.

A VM 136 may emulate a computer system with its own dedicated hardware. A VM 136 may run a guest operating system on top of the VMM 134. The components of system 100 (e.g., processor 102, cryptographic engine 104, memory 122, I/O subsystem 124, data storage device 126, display device 128, a GPU (not shown), UI subsystem 130, communication subsystem 132) may be virtualized such that it appears to the guest operating system that the VM 136 has its own dedicated components.

The SEAM module 138 may be a security-services module that helps enforce security policies for the TDs. In some embodiments, the SEAM module 138 may be digitally signed so that authorship of the SEAM module 138 may be ascertained by a user of the system 100 (e.g., to indicate trustworthiness of the SEAM module 138). The SEAM module 138 may be hosted in a reserved memory space (e.g., of memory 122 or other memory of the computing system 100) identified by a range register (which may be referred to as a SEAM-range register (SEAMRR)). The processor 102 may only allow access to the SEAM-memory range to software executing inside the SEAM-memory range and all other software accesses and direct-memory accesses from devices to this memory range are not allowed.

The SEAM module 138 may be installed by an authenticated-code module (ACM) which may be referred to as a SEAM loader, which may help verify the digital signature on the SEAM module and load the SEAM module into the SEAM-memory range. When the SEAM module is loaded into the SEAM-memory range, attributes of the SEAM module (e.g., a version number of the SEAM module) may be stored in a register 106 of the processor to be checked against security policies of a user (e.g., a cloud service provider) of the system 100. Embodiments may allow the VMM to read (but not modify) the SEAM code and configuration (everything excluding secret information such as secret memory encryption keys, RSA keys, private keys, etc. which may be stored in a hidden memory region or encrypted with a private memory encryption key) in order to verify the SEAM module is installed and configured correctly (and therefore may be trusted by the VMM). In various embodiments, the SEAM code and configuration may also be protected by a read-only KeyID. For example, the SEAM code itself could be readable to the VMM 134 (e.g., this could help the VMM verify that the SEAM module 138 was correctly patched to a new version). Similarly, the interrupt descriptor table (IDT) of SEAM could be made readable to the VMM via the read-only KeyID.

In some embodiments, the processor 102 may operate in multiple different SEAM modes. For example, the processor 102 may operate in a SEAM root mode and a SEAM non-root mode. A SEAM root mode may be the highest privilege mode. It may allow the SEAM module 138 to manage hardware, control registers, extended page tables, interrupts, Software Management Mode (SMM), and generally remain separate and protected from the TDs (secure VMs) that the SEAM module manages. In the SEAM non-root mode, the TDs may execute, running with reduced privileges and limited access to hardware and memory (e.g. as controlled by the SEAM managed secure extended page tables).

A SEAMCALL instruction may be called by the VMM 134 to place the processor 102 into a SEAM root mode and invoke the SEAM module 138. The SEAM module 138 may provide an interface to the VMM 134 to create, delete, and schedule execution of TDs (e.g., VMs 136). As part of the TD (e.g., VM 136) creation, the VMM 134 sets up the memory pages for the TD code, data, and TD-associated-metadata structures.

The processor 102 may also operate in a SEAM non-root mode to execute more limited instructions from the TDs (e.g., VMs 136). The SEAM non-root mode may be entered using VMRESUME and VMLAUNCH (or other suitable instructions) to execute the TD within the memory regions mapped to the TD via the SEAM managed secure extended page table (S-EPT). This EPT structure is an example of a SEAM managed structure that may be shared with the VMM using a transformer KeyID (e.g., 111B) as described herein. A SEAMRET instruction (or other suitable instruction) returns execution control to the VMM 134.

The private keys for the TDs may also be created by the SEAM module 138 (e.g., responsive to a request from the VMM 134). For example, the SEAM module 138 may call a PCONFIG instruction to program a unique key generated by processor 102 for each TD KeyID 110 used. The keys (e.g., 116) may be programmed into the cryptographic engine 104.

The memory 122 is communicatively coupled to the processor 102, e.g., via the I/O subsystem 124. The I/O subsystem 124 may be embodied as circuitry and/or components to facilitate input/output operations with the processor 102, the memory 122, and other components of the computing system 100. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with one or more of the processor 102, the memory 122, and/or other components of the computing system 100, on a single integrated circuit chip. Other processing components such as the GPU may share the same memory 122 as the processor with a SEAM mode to allow GPU execution engines to use shared virtual memory (SVM) to access VM and TD memory directly using the same page table translations. Here the GPU would have a SEAM mode to set the TD bit when running in a trusted configuration and use the S-EPTs to access private key IDs to read and/or write TD memory when TDs opt into using the GPU (or other accelerator) directly as a trusted co-processor.

The data storage device 126 may be embodied as any type of physical device or devices configured for short-term or long-term storage of data such as, for example, memory devices and circuits, memory cards, hard disk drives, solid-state drives, flash memory or other read-only memory, memory devices that are combinations of read-only memory and random access memory, or other data storage devices. In various embodiments, memory 122 may cache data that is stored on data storage device 126.

The display device 128 may be embodied as any type of display capable of displaying digital information such as a liquid crystal display (LCD), a light emitting diode (LED), a plasma display, a cathode ray tube (CRT), or other type of display device. In some embodiments, the display device 128 may be coupled to a touch screen or other human computer interface device to allow user interaction with the computing system 100. The display device 128 may be part of the user interface (UI) subsystem 130. The user interface subsystem 130 may include a number of additional devices to facilitate user interaction with the computing system 100, including physical or virtual control buttons or keys, a microphone, a speaker, a unidirectional or bidirectional still and/or video camera, and/or others. The user interface subsystem 130 may also include devices, such as motion sensors, proximity sensors, and eye tracking devices, which may be configured to detect, capture, and process various other forms of human interactions involving the computing system 100.

The computing system 100 further includes a communication subsystem 132, which may be embodied as any communication circuit, device, or collection thereof, capable of enabling communications between the computing system 100 and other electronic devices. The communication subsystem 132 may be configured to use any one or more communication technology (e.g., wireless or wired communications) and associated protocols (e.g., Ethernet, Bluetooth™, Wi-Fi™, WiMAX, 3G/LTE, etc.) to effect such communication. In some embodiments, the communication subsystem 132 may be embodied as a network adapter, such as a wireless network adapter.

FIGS. 2A-2B illustrate example architectures in which private TD code and data are protected. In particular, FIG. 2A illustrates a current architecture 200 in which a TD's private key is used to encrypt the code and data 204 (e.g., 204A, 204B, or 204C) of a TD as well as management structures 206 (e.g., 206A, 206B, or 206C), such as memory management or other control structures of the TD, while FIG. 2B illustrates a proposed architecture 250 in which the management structures of the TDs may be encrypted by a transformer key identified by a transformer KeyID in accordance with certain embodiments, allowing a VMM 134 to quickly and directly access the management structures (e.g. S-EPTs, VMCSs, PMLs, etc.) by using the transformer KeyID.

Code and data 204 of a TD may include program instructions of the TD that are executed by a core of the processor 102 (e.g., in SEAM non-root mode) as well as any suitable data supporting the operations of the TD (e.g., data generated during execution of the TD). Management structures 206 may include any suitable data structures supporting the operation of their respective TDs that may be shared with the VMM 134. For example, a management structure 206 may include an extended page table (e.g., a secure extended page table) or nested page table for the corresponding TD. Such a page table may be built by the VMM 134 and may provide guest physical address (GPA) to host physical-address (HPA) translations. These page tables may be used in conjunction with page tables built by the individual VMs (e.g., via the operating systems of the VMs) that map virtual addresses (sometime referred to as linear addresses) to guest physical addresses in order to obtain a physical memory address mapped to a virtual address when memory 122 is accessed by the VMM 134 or a VM 136. When an access to memory 122 is received from a TD (e.g., TD_A) using a virtual (or linear) address, page walk circuitry of the processor 102 will walk the page table of the VM to obtain the guest physical address (that maps to a virtual memory address specified in the access) and then will walk the extended page table or nested page table to obtain the physical address that corresponds to the guest physical address. This mapping is then cached in a translation lookaside buffer (along with permissions) so the processor may quickly translate virtual to physical addresses on subsequent accesses. Thus, only the guest physical address (and not the physical address) of the memory is exposed to the TD.

A management structure 206 (e.g., 206A) may also include, for the corresponding TD (e.g., TD_A), a page modification log and accessed/dirty (A/D) bits that are stored within or in association with the extended page table or nested page table. The A/D bits may indicate whether a memory page has been accessed (A) or written to and are thus dirty (D) by the TD and may be used for paging and other management operations (e.g., defragmentation, copy on write). The page modification log may include a record of guest physical addresses that have been recently written to such that the VMM 134 does not need to walk the extended page table or nested page table to detect which pages were recently written to. The page modification log may be updated at the same time that the A/D bits are updated responsive to a write operation. Other structures may include the virtual machine control structures (VMCS) managed but the SEAM module 138, which include the configuration and execution state of the VMs 136, information that the VMM may need to read or write to, avoiding a SEAM call to access these structures or portions thereof using the transformer KeyID.

The architecture 200 includes a memory 202 (which may correspond to or include any of the characteristics of memory 122) storing code and data (204A-C) for three TDs (TD_A, TD_B, and TD_C) along with the associated management structures, MS_A, MS_B, and MS_C (206A-C). Although FIG. 2 depicts three different TDs, in various embodiments system 100 may support any number of TDs. In the architecture 200, each TD's private code and data and management structures are encrypted and integrity protected with the corresponding TD's private key (associated with its TD KeyID 110). For example, TD_A's code and data 204A and management structures 206A are each protected by a private key of TD_A, TD_B's code and data 204B and management structures 206B are each protected by a private key of TD_B, and so on. The owning TD and the SEAM module 138 have read and write access to the TD's code and data and only the SEAM module 138 has direct access to the management structures 206. In order to update or access the management structures, the VMM 134 makes SEAMCALLs to the SEAM module 138 to request update/access to management structures 206. As an example, construction of secure EPTs for a TD is accomplished through the VMM 134 making SEAMCALLs to the SEAM module 138, which then constructs the TD's secure EPT structure on behalf of the VMM 134. The VMM is disallowed direct access to TD's private code and data and associated management structures. Some embodiments may set these structures to be read only or not-present in the VMM's protected memory via page tables such that page faults will be generated when the VMM attempts to read or write to the structures, and these page faults may then be converted into SEAMCALLs containing the desired memory write modifications or memory reads attempted by the VMM.

This isolation is achieved by the architecture by the processor not allowing the VMM 134 to use any TD private KeyID 110 (where a TD private KeyID identifies a cryptographic key 116 utilized by the cryptographic engine 104 to encrypt or decrypt data of a TD). For example, a single bit (referred to earlier as the TD bit or memory ownership bit) stored in error correction code (ECC) metadata associated with a cacheline (or other unit) of a TD's code or data may be used for indicating memory ownership and upon each read, the value of this bit is read from memory and checked with the incoming access to ensure that the source of the incoming access matches the owner of the data line. As an example, for TD data, the TD bit will be set to 1 and the VMM's attempt to access TD data would result in a TD bit mismatch at the memory controller 103 and the access may deterministically return all zeros or other predetermined value. As an aside, in some embodiments, data associated with a TD may be marked as shared data, in which case the VMM may access such data with a shared KeyID, but an attempt by the VMM to use a shared KeyID to access private TD data would naturally result in an integrity failure. Thus, in the current architecture 200 the SEAM module 138 and the owning TD are allowed access to the TD private memory (code and data 204) and only the SEAM module 138 is allowed direct access to the management structures.

While disallowing VMM access to the private code and data to ensure VMM is out of the trust boundary is desired behavior to protect the TDs from the VMM, disallowing direct access to the management structures is not required and may hinder performance. More specifically, the VMM may need access to some of the management structures 206 to implement its management functions. As an example, EPTs may need to be accessed for TD migration and/or edited by the VMM for memory management. In the architecture 200, the VMM is provided read access to these structures using SEAMCALLs. However, using SEAM-CALLs requires an expensive mode switch and additional enabling for the VMM which currently access these structures directly in memory.

In the proposed architecture 250, the management structures 206 are protected with encryption keys associated with two transformer KeyIDs, one trusted transformer KeyID (e.g., 111A) for use by TDs accessing the management structures 206 and one untrusted transformer KeyID (e.g., 111B) for use by the VMM to access the management structures 206. In certain embodiments, the trusted and untrusted transformer KeyID may be the same key, but with the identifiers being different from one another. Each TD's private code and data is still protected with a unique encryption key associated with a unique TD KeyID (e.g., 110). From a security standpoint, the management structures might not need to be protected with their own separate keys. Like in architecture 200, a TD's private code and data can only be accessed by the TD that owns the code/data or by the SEAM module. However, in the architecture 250, the VMM can directly read and write the management structures 206 (e.g. Secure Extended Page Tables) using an untrusted transformer KeyID and the TDs can access the management structures 206 using a trusted transformer KeyID as described herein.

Accesses by the TD to management structure data written using untrusted transformer KeyID may cause a TDExit event and fault to the SEAM module. The SEAM module may then decrypt the data using the untrusted transformer KeyID, inspect/verify the data, and if verified, re-encrypt the data using the trusted transformer KeyID. After this, the TD may resume and access the management structure data using the trusted transformer KeyID. While the present disclosure describes control/management structures such as EPT/SEPT, VMCS, PMLs etc. to be located in this region, any sharing between TDs and VMM can be done using the transformer KeyIDs, including input/output (IO) data. To ensure security, the private code and data for each TD is still encrypted with a TD-specific unique key (associated with a TD KeyID, e.g., 110) and any attempt by the VMM to access the TD's private code and any attempt by VMM to access TD's private code and data will either result in deterministic zeros being returned or an integrity failure due to access using an incorrect KeyID.

With the architecture 200, the KeyID space is divided by a Basic Input/Output System (BIOS) for shared KeyIDs (which are available for use by the VMM to access shared TD memory) and private KeyIDs (available for use by the SEAM module 138 for private TD memory). The BIOS may be responsible to set up this split of the KeyID space. In certain embodiments, two KeyIDs in the private KeyID space may be reserved by the BIOS to be used as transformer KeyIDs: one trusted transformer KeyID and one untrusted transformer KeyID. To do so, a new MSR, IA32_TRANSFORMER_KEYID, can be used. BIOS can set up the transformer KeyIDs using WRMSR IA32_TRANSFORMER_KEYID. BIOS can use two of the private KeyIDs as the transformer KeyIDs in certain instances. Since BIOS is not trusted for VM isolation, MCHECK (or any trusted module) may be used to verify that the transformer KeyIDs set up by the BIOS is one of the private KeyIDs. The SEAM module can then read RDMSR IA32_TRANSFORMER_KEYID to know the KeyIDs set up by the BIOS as the transformer KeyIDs. It is important to note that by using two of the private KeyIDs as the transformer KeyIDs, non-SEAM software will be prevented from changing or controlling the programming (e.g., key or encryption mode) associated with the transformer KeyIDs using the key programming instruction, PCONFIG.

The two transformer KeyIDs may be programmed identically with the same keys and encryption mode in the cryptographic engine. However, the trusted transformer KeyID can only be used from trusted software (e.g., SEAM module or TDs) and the untrusted transformer KeyID can used by untrusted software (e.g., VMM).

The SEAM module will not use the transformer KeyID for any TD. Instead, the management structures or any code/data that SEAM module intends to allow the VMM to access are encrypted and integrity protected by SEAM using the trusted transformer KeyID. Note that the data shared using transformer KeyID might not have confidentiality requirements and hence can be an integrity-only KeyID without encryption in certain embodiments.

Figure 3:
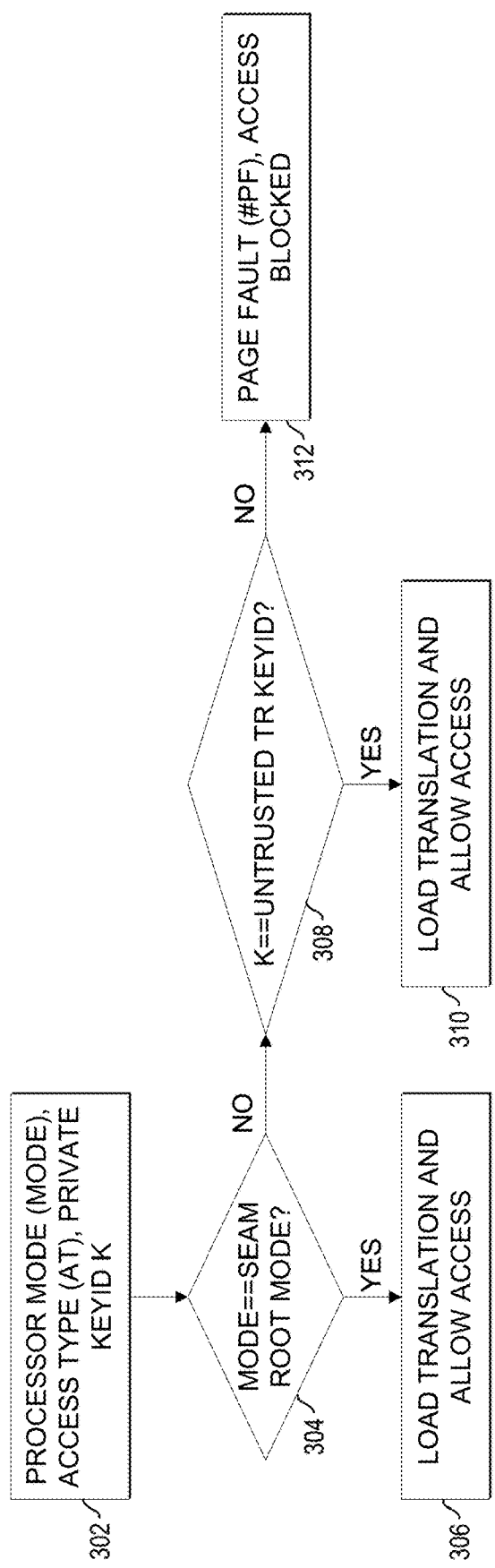
FIG. 3 depicts a flow for servicing an access request specifying the transformer KeyID in accordance with certain embodiments.

FIG. 3 depicts a flow for servicing an access request specifying a transformer KeyID in accordance with certain embodiments. The page miss handler (PMH) hardware of the system 100 may enforce the access control desired for the transformer KeyIDs. The flow in FIG. 3 shows what happens when the page table walk is triggered by a miss in the translation lookaside buffer (TLB) due to an access by a private TD KeyID 110 (where the TLB may function as a cache for the page table translations which are stored in memory 122).

At 302, the PMH hardware receives or otherwise identifies an indication of the current mode of processor execution and the memory access type (e.g., read or write) that resulted in the page table walk to fill the TLB, and the KeyID K used for the access. At 304, the PMH hardware determines whether the processor is executing in SEAM root mode or not. If the processor is executing in SEAM root mode (and thus is executing instructions from the SEAM module 138), the PMH walks the page tables and loads the translation of the virtual address to physical address to the TLB to allow access regardless of the access type at 306 (in accordance with the SEAM configured page table permissions). This ensures that the SEAM module 138 has unrestricted access to all memory as it does in the current architecture (e.g., 200). In certain embodiments, a SEAM non-root mode may be detected for a TD execution, and the secure-EPT may be walked to decide if a TD can access a particular physical page or not.

At 306, if the processor mode is not SEAM root mode (e.g., the processor is in a standard execution mode and thus presumably the instruction is from the VMM 134), the PMH hardware checks if the KeyID used for access is the untrusted transformer (TR) KeyID. If the KeyID used in the access is the untrusted transformer KeyID, the PMH loads the translation to the TLB to allow access at 310. This ensures that VMM accessing a page with the untrusted transformer KeyID is allowed read/write access without having to execute a SEAMCALL. If, on the other hand, KeyID used for the access is one other than the untrusted transformer KeyID (including the trusted transformer KeyID), at 312, the PMH hardware signals a page fault (#PF) and access to the memory is blocked (e.g., in a similar manner to how memory is protected for all private KeyIDs). In other embodiments, different responses to a write attempt by the VMM may be used, e.g., a general protection fault (#GP).

With the untrusted transformer KeyID, the VMM can attempt to access any TD's private memory (e.g., 204), and allowing VMM access to TD memory can open the TDs up to several attacks, such as software replay and dictionary attacks. However, with memory integrity enabled for the KeyID, an attempt by the VMM to access any TD's private memory (e.g., 204) with the untrusted transformer KeyID may result in an integrity failure. Additionally, even though the untrusted transformer KeyID is carved out from private KeyID space, in certain embodiments, a TD bit that is associated with each cacheline in memory will be unset when a write is made using the untrusted transformer KeyID (since it would have previously been set by the TD when accessing it). This may ensure that the VMM can continue to read the memory protected with the untrusted transformer KeyID without TD bit mismatches, but any time the VMM makes an attempt to read TD private memory with the untrusted transformer KeyID, it will result in an integrity failure (since the TD bit would be set in these scenarios).

Figure 4:
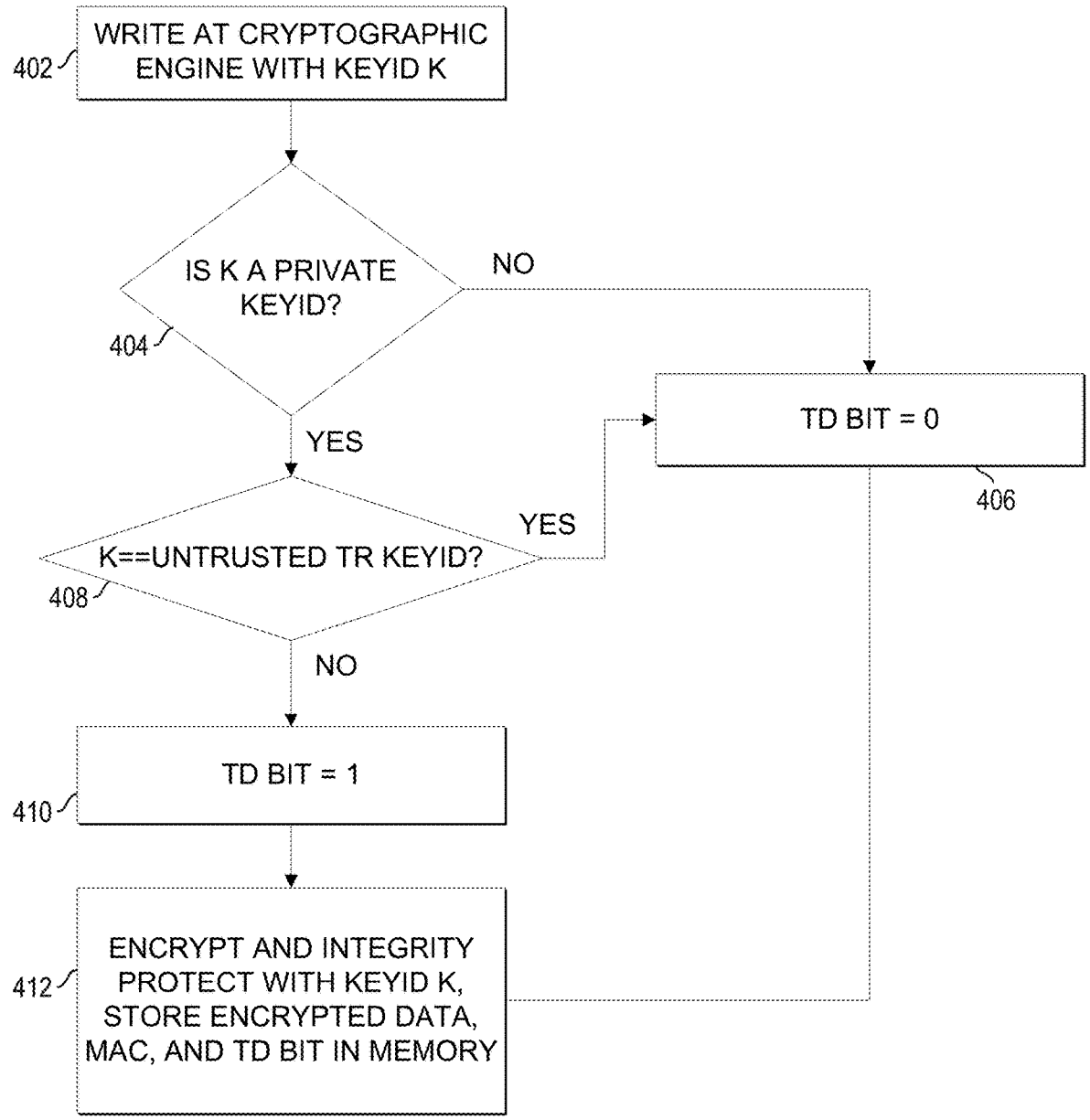
FIG. 4 illustrates a flow for writing data using a KeyID in accordance with certain embodiments.

FIG. 4 illustrates a flow for writing data using a KeyID in accordance with certain embodiments. At 402, a write command that references a KeyID "K" is received at memory controller 103 (e.g., at the cryptographic engine 104). At 404, the memory controller 103 may determine whether K is a private KeyID (e.g., whether the reference to the KeyID is within the address space of the private KeyIDs). If not, a trusted domain (TD) bit is set to zero at 406 to indicate the access is from untrusted software. If K is a private KeyID, then at 408, a determination is made as to whether K is the untrusted transformer KeyID (e.g., 111B). If so, the TD bit is set to zero at 406 again to indicate the access is from untrusted software. However, if K is not the untrusted transformer KeyID, the TD bit is set to 1 to indicate a write from trusted software (e.g., using a TD KeyID 110 or the trusted transformer KeyID 111B). At 412, the write data is encrypted using the key corresponding to KeyID K, and a message authentication code (MAC) (or other integrity protection code) is generated using the key corresponding to the KeyID K. The encrypted write data, corresponding MAC, and TD bit are then stored in memory (e.g., 122).

Figure 5:
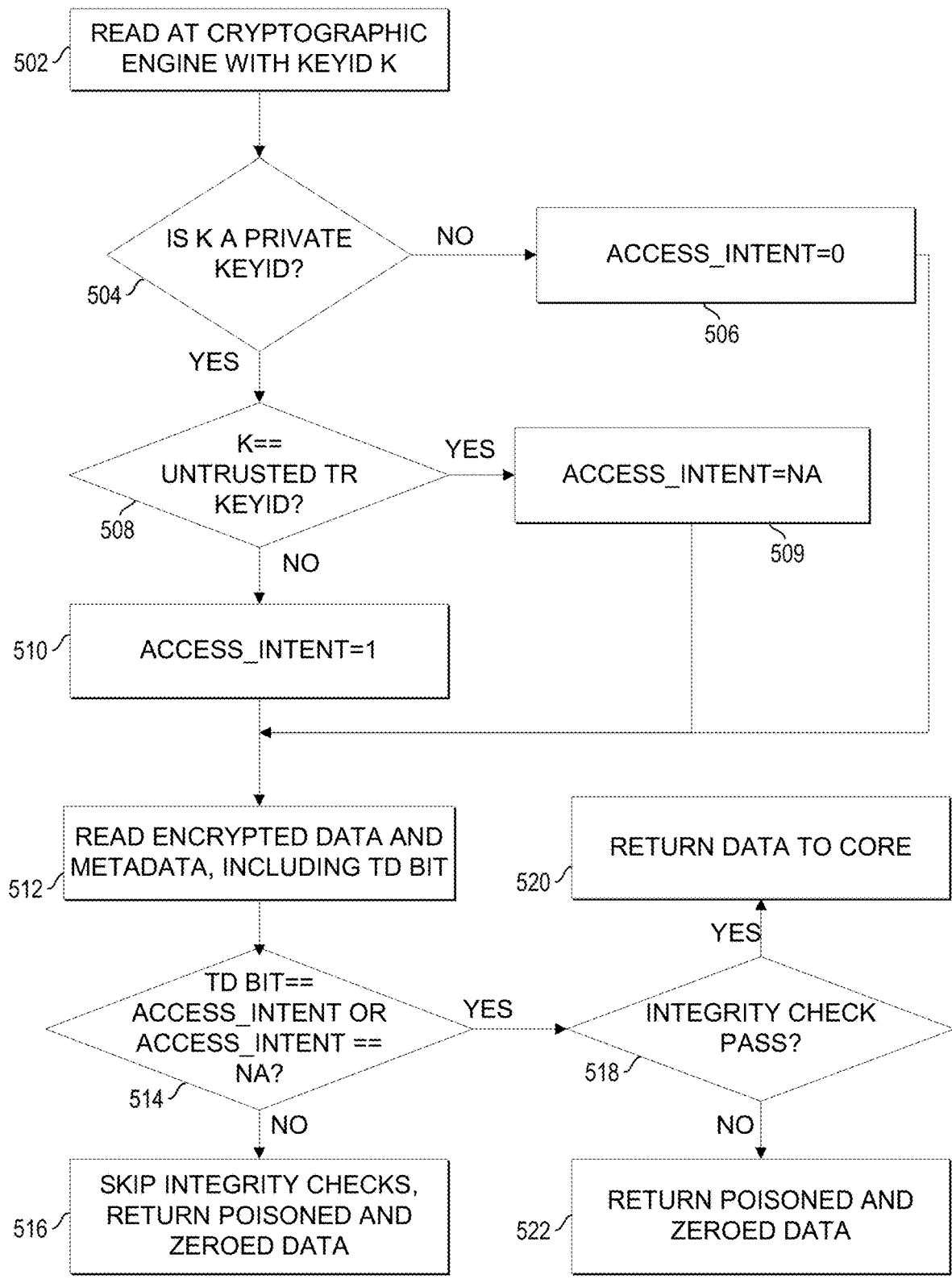
FIG. 5 illustrates a flow for reading data using a KeyID in accordance with certain embodiments.

FIG. 5 illustrates a flow for reading data using a KeyID in accordance with certain embodiments. At 502, a read access request that references a KeyID K is received at memory controller 103 (e.g., at the cryptographic engine 104). At 504, a determination is made as to whether K is a private KeyID (e.g., whether the reference to the KeyID is within the address space of the private KeyIDs). If not, then an access_intent value (which may be used to track whether an access is from trusted or untrusted software) is set to zero at 506. If K is a private KeyID, then a determination is made at 508 as to whether K is the untrusted transformer KeyID. If not, then the access_intent value is set to 1 to indicate a read from trusted software. If, however, K is the untrusted transformer KeyID, then the access_intent value is set to NA at 509 to indicate that the untrusted transformer KeyID is allowed to bypass the TD bit check. This may ensure that the VMM is able to freely read management structure data, such as EPTs, that it creates for the TDs. However, if a malicious VMM tries to use the untrusted transformer KeyID to access TD private memory, it will be caught by integrity checks later on, as TD private memory is encrypted and integrity protected using the TD's private KeyID.

In some embodiments, a trusted entity (e.g., TD) may receive a notification prior to attempting to consume data that was written by the VMM using the untrusted transformer KeyID, but not yet validated by the SEAM module (trusted side). That is, the notification may occur just before the consumption of potentially insecure data when that poisoned cacheline is returned instead from the cryptographic engine.

After 508, 509, or 510, the flow resumes at 512, where encrypted data and associated metadata such as a MAC and TD bit are read from memory. At 514, a determination is made as to whether the value of the read TD bit equals the access_intent value or the access_intent is set to NA. If the value of the TD bit is not equal to the access_intent value (indicating that an unauthorized entity is attempting to access TD private memory or that an entity is attempting to use a TD's private key to decrypt data that is not part of a TD's private memory), then integrity checking of the data is skipped, poisoned and zeroed data (or other predetermined value) is returned to the core at 516. If the TD bit is equal to the access_intent value, then the integrity is verified at 518 (e.g., by calculating a MAC on the retrieved data and checking it against a MAC read with the data). If integrity verification passes, then at 520, the data is returned to the core. If the integrity verification does not pass, then at 522, the data is poisoned and zeroed (or other predetermined value) and then returned to the core. Additionally or alternatively, page faults may be triggered at 516 or 522.

Figure 6:
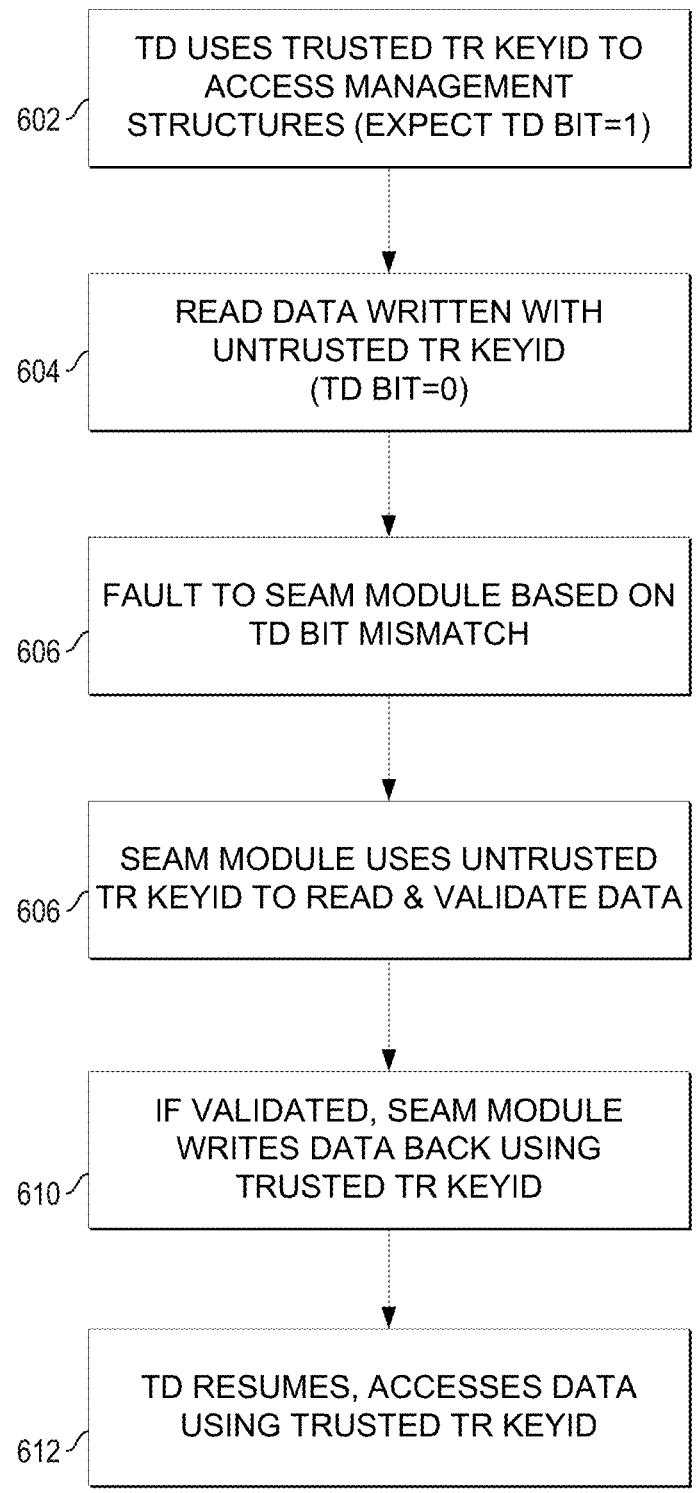
FIG. 6 illustrates a flow for handling a fault raised in response to reading data written with an untrusted transformer KeyID.

FIG. 6 illustrates a flow for handling a fault raised in response to reading data written with an untrusted transformer KeyID. At 602, a TD uses a trusted transformer KeyID (e.g., 111A) to access management structure data (e.g., 206 of FIG. 2B). This may include, for instance, a core PMH walking TD page tables using the trusted transformer KeyID. When accessing data using the trusted transformer KeyID, the PMH may expect to read TD bits=1 as described above.

At 604, the PMH reads data previously written with the untrusted transformer KeyID (e.g., 111B), which includes reading data that has a TD bit set to 0 (e.g., as described above with respect to FIG. 4). Reading the data will cause poisoned/zeroed data to be returned to the core, as described above with respect to FIG. 5.

At 606, the PMH faults to the SEAM module based on the mismatch in the TD bits (expected vs. read), which may cause a TDExit event for the TD. In some embodiments, the faulting physical address of the extended page table entry (PTE) may be made available to the SEAM module by the PMH. This could be reported in the TDCS due to the TDExit, where as a PTE page fault address would be reported in CR2.

At 608, the SEAM module uses the untrusted transformer KeyID to read and validate the data. For example, where the data was previously written by the VMM, the SEAM module may use the untrusted transformer KeyID to read page table entries written by the VMM, inspect and validate the data. For instance, a single physical page cannot be mapped to two different TDs as otherwise one TD (potentially malicious) can track the other TDs activity, read its ciphertext, and ultimately break confidentiality. In some embodiments, therefore, as part of the inspection/validation process, the SEAM module may ensure that the physical page that the VMM is mapping a TD page to is not already allocated to a TD. The SEAM module may also validate that data mapped has the correct permissions (e.g., no execute on data pages).

At 610, if the data is validated, the SEAM module writes the data back to memory using the trusted transformer TD KeyID. Thereafter, at 612, the TD resumes and the TD accesses the data using the trusted transformer KeyID. Because the data was re-written using this KeyID at 610, the TD no longer sees a fault.

In another embodiment, there could be a special bit used (similar to poison) to indicate this a transformer KeyID read check is required vs. a different error, such as detected but uncorrected error. This may allow the SEAM module to do the transformation actions described above.

In is important to note that the coherence protocol of the above flows may take care of eliminating KeyID aliases from the core caches and hence, the accesses made with the trusted transformer KeyID can eliminate data in the cache created with the untrusted transformer KeyID.

Using the above flows, the following scenarios may be implemented to enable seamless write access to management structure data by a VMM. For example, a VMM may write to TD EPTs with the untrusted transformer KeyID, setting the TD bit to 0. Next, a TD may read the VMM-edited management structures. The PMH may use the trusted transformer KeyID to walk the page tables, and thus, a TD bit mismatch happens at the cryptographic engine and poisoned/zeroed data is returned to the core. The PMH, on receiving poison, faults to the SEAM module, which uses the untrusted transformer KeyID to read the VMM-edited management structures. The SEAM module also inspects/validates the read data and if validated, writes it back to memory with the trusted transformer KeyID, setting the TD bit to 1 so that subsequent accesses by trusted software (e.g., the TD) do not fault. VMM attempts to access the re-written data with the untrusted transformer KeyID will be allowed, while VMM attempts to access TD private data written using the TD's private key will cause an integrity failure due to the use of the incorrect key.

The flows described in FIGS. 2-6 are merely representative of operations or communications that may occur in particular embodiments. In other embodiments, additional operations or communications may be performed in the flows. Various embodiments of the present disclosure contemplate any suitable signaling mechanisms for accomplishing the functions described herein. Some of the operations illustrated in FIGS. 2-6 may be repeated, combined, modified, or deleted where appropriate. Additionally, operations may be performed in any suitable order without departing from the scope of particular embodiments. Further, although the flows may be described with respect to paging structures, it will be understood that aspects of the present disclosure may extend to any control structure for VMs (e.g., VM Control Structures, TD Control Structures, Extended page tables and any data buffers which the VMM normally would manage (read and write).

FIGS. 7-10 are block diagrams of exemplary computer architectures that may be used in accordance with any of the embodiments disclosed herein. Generally, any computer architecture designs known in the art for processors and computing systems may be used. In an example, system designs and configurations known in the arts for laptops, desktops, handheld PCs, personal digital assistants, tablets, engineering workstations, servers, network devices, servers, appliances, network hubs, routers, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable for embodiments of computing systems described herein. Generally, suitable computer architectures for embodiments disclosed herein can include, but are not limited to, configurations illustrated in FIGS. 7-10.

Figure 7:
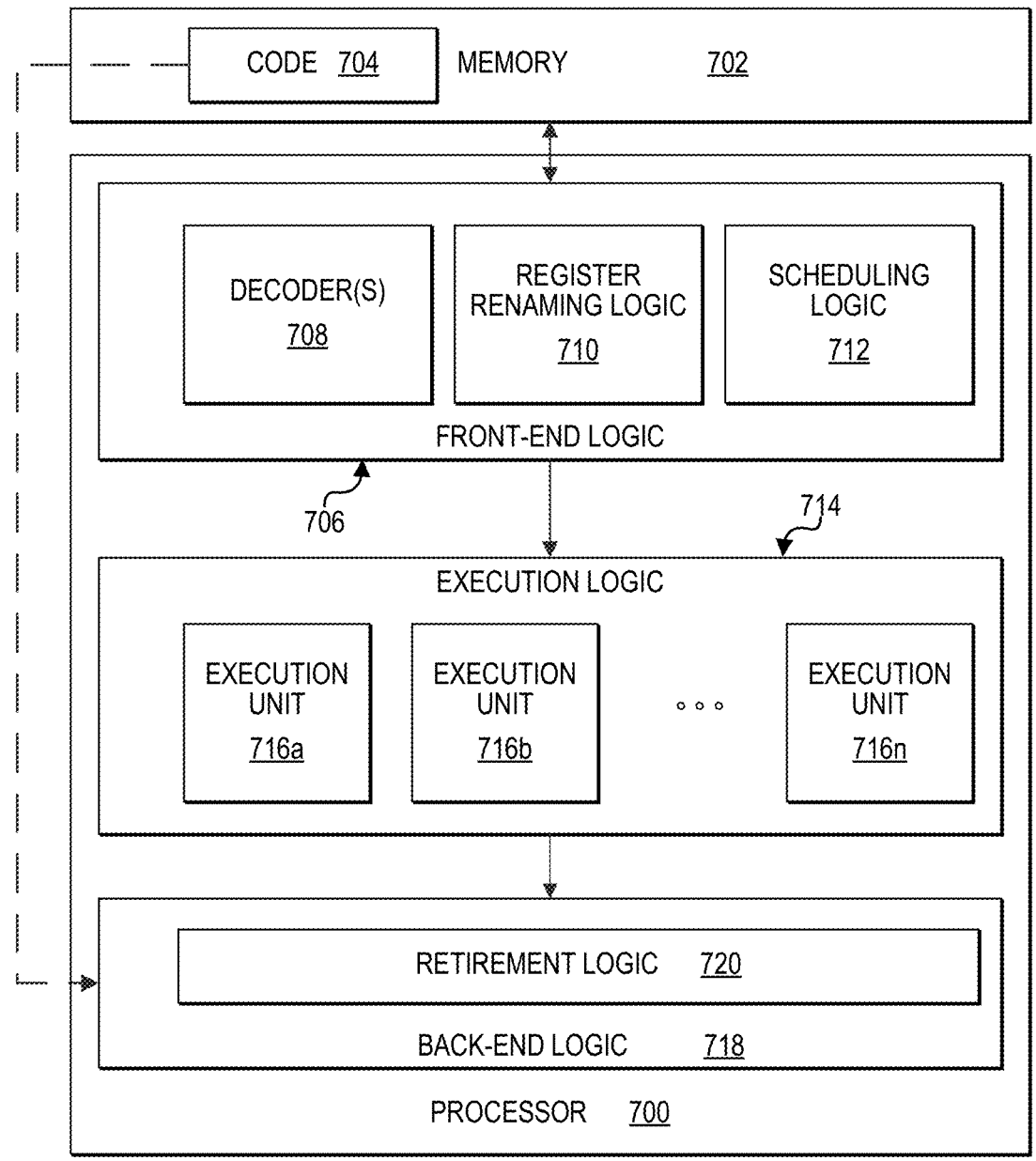
FIG. 7 is a block diagram illustrating an example processor core and memory according to at least one embodiment.
Figure 8:
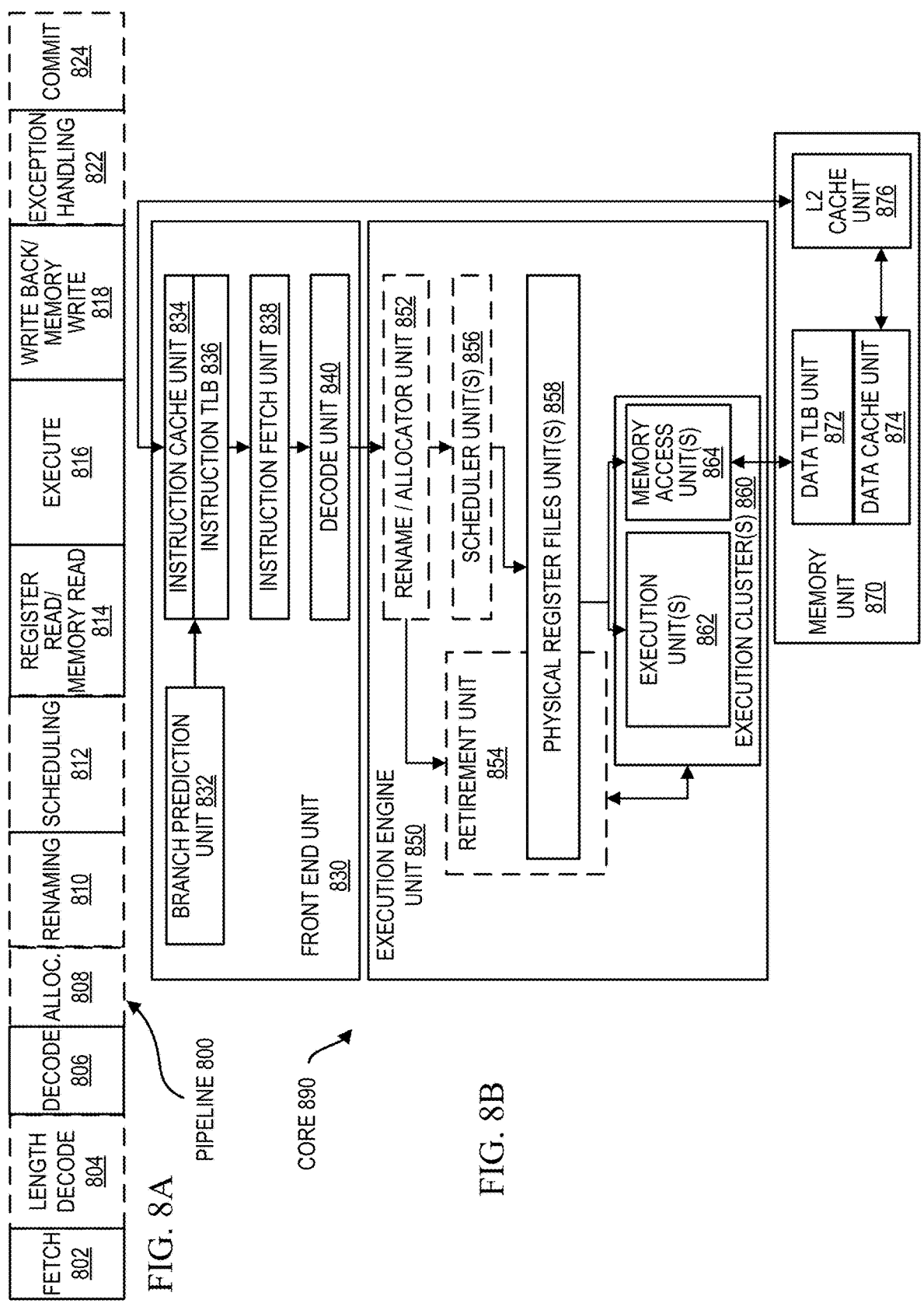
FIG. 8A is a block diagram illustrating both an exemplary in-order pipeline and an exemplary register renaming, out-of-order issue/execution pipeline in accordance with certain embodiments.
FIG. 8B is a block diagram illustrating both an exemplary embodiment of an in-order architecture core and an exemplary register renaming, out-of-order issue/execution architecture core to be included in a processor in accordance with certain embodiments.

FIG. 7 is an example illustration of a processor according to an embodiment. Processor 700 is an example of a type of hardware device that can be used in connection with the implementations shown and described herein (e.g., processor 102). Processor 700 may be any type of processor, such as a microprocessor, an embedded processor, a digital signal processor (DSP), a network processor, a multi-core processor, a single core processor, or other device to execute code. Although only one processor 700 is illustrated in FIG. 7, a processing element may alternatively include more than one of processor 700 illustrated in FIG. 7. Processor 700 may be a single-threaded core or, for at least one embodiment, the processor 700 may be multi-threaded in that it may include more than one hardware thread context (or "logical processor") per core.

FIG. 7 also illustrates a memory 702 coupled to processor 700 in accordance with an embodiment. Memory 702 is an example of a type of hardware device that can be used in connection with the implementations shown and described herein (e.g., memory 122). Memory 702 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 700 can execute any type of instructions associated with algorithms, processes, or operations detailed herein. Generally, processor 700 can transform an element or an article (e.g., data) from one state or thing to another state or thing.

Code 704, which may be one or more instructions to be executed by processor 700, may be stored in memory 702, or may be stored in software, hardware, firmware, or any suitable combination thereof, or in any other internal or external component, device, element, or object where appropriate and based on particular needs. In one example, processor 700 can follow a program sequence of instructions indicated by code 704. Each instruction enters a front-end logic 706 and is processed by one or more decoders 708. The decoder may generate, as its output, a micro operation such as a fixed width micro operation in a predefined format, or may generate other instructions, microinstructions, or control signals that reflect the original code instruction. Front-end logic 706 also includes register renaming logic 710 and scheduling logic 712, which generally allocate resources and queue the operation corresponding to the instruction for execution.

Processor 700 can also include execution logic 714 having a set of execution units 716*a*, 716*b*, 716*n*, etc. Some embodiments may include a number of execution units dedicated to specific functions or sets of functions. Other embodiments may include only one execution unit or one execution unit that can perform a particular function. Execution logic 714 performs the operations specified by code instructions.

After completion of execution of the operations specified by the code instructions, back-end logic 718 can retire the instructions of code 704. In one embodiment, processor 700 allows out of order execution but requires in order retirement of instructions. Retirement logic 720 may take a variety of known forms (e.g., re-order buffers or the like). In this manner, processor 700 is transformed during execution of code 704, at least in terms of the output generated by the decoder, hardware registers and tables utilized by register renaming logic 710, and any registers (not shown) modified by execution logic 714.

Although not shown in FIG. 7, a processing element may include other elements on a chip with processor 700. For example, a processing element may include memory control logic along with processor 700. The processing element may include I/O control logic and/or may include I/O control logic integrated with memory control logic. The processing element may also include one or more caches. In some embodiments, non-volatile memory (such as flash memory or fuses) may also be included on the chip with processor 700.

FIG. 8A is a block diagram illustrating both an exemplary in-order pipeline and an exemplary register renaming, out-of-order issue/execution pipeline according to one or more embodiments of this disclosure. FIG. 8B is a block diagram illustrating both an exemplary embodiment of an in-order architecture core and an exemplary register renaming, out-of-order issue/execution architecture core to be included in a processor according to one or more embodiments of this disclosure. The solid lined boxes in FIG. 8A-8B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a schedule (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. Processor core 890 and memory unit 870 are examples of the types of hardware that can be used in connection with the implementations shown and described herein (e.g., processor 102, memory 122). The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like. In addition, processor core 890 and its components represent example architecture that could be used to implement logical processors and their respective components.

The front end unit 830 includes a branch prediction unit 832 coupled to an instruction cache unit 834, which is coupled to an instruction translation lookaside buffer (TLB) unit 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers (GPRs). In at least some embodiments described herein, register units 858 are examples of the types of hardware that can be used in connection with the implementations shown and described herein (e.g., registers 106). The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Execution units 862 may also include an address generation unit to calculate addresses used by the core to access main memory (e.g., memory unit 870) and a page miss handler (PMH).

The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory. In addition, a page miss handler (e.g., page miss handler 826) may also be included in core 890 to look up an address mapping in a page table if no match is found in the data TLB unit 872.

By way of example, the exemplary register renaming, out-of-order issue/execution core architecture may implement the pipeline 800 as follows: 1) the instruction fetch unit 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology). Accordingly, in at least some embodiments, multi-threaded enclaves may be supported.

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 9:
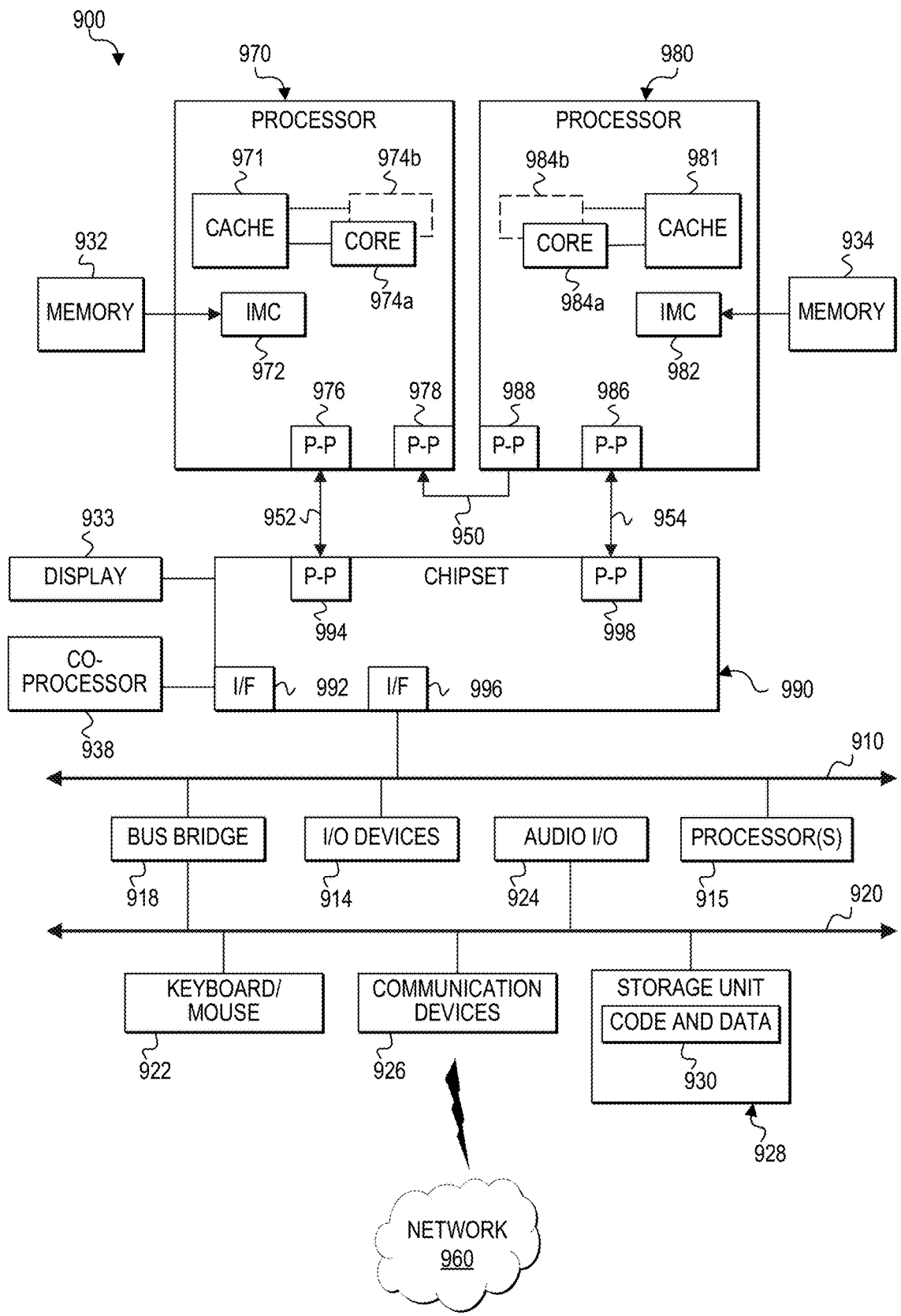
FIG. 9 is a block diagram of an example computer architecture according to at least one embodiment.

FIG. 9 illustrates a computing system 900 that is arranged in a point-to-point (PtP) configuration according to an embodiment. In particular, FIG. 9 shows a system where processors, memory, and input/output devices are interconnected by a number of point-to-point interfaces. Generally, one or more of the computing systems or computing devices described (e.g., computing system 100) herein may be configured in the same or similar manner as computing system 900.

Processors 970 and 980 may be implemented as single core processors 974a and 984a or multi-core processors 974a-974b and 984a-984b. Processors 970 and 980 may each include a cache 971 and 981 used by their respective core or cores. A shared cache (not shown) may be included in either processors or outside of both processors, yet connected with the processors via P-P interconnect, such that either or both processors' local cache information may be stored in the shared cache if a processor is placed into a low power mode. It should be noted that one or more embodiments described herein could be implemented in a computing system, such as computing system 900. Moreover, processors 970 and 980 are examples of the types of hardware that can be used in connection with the implementations shown and described herein (e.g., processor 102).

Processors 970 and 980 may also each include integrated memory controller logic (MC) 972 and 982 to communicate with memory elements 932 and 934, which may be portions of main memory locally attached to the respective processors. In alternative embodiments, memory controller logic 972 and 982 may be discrete logic separate from processors 970 and 980. Memory elements 932 and/or 934 may store various data to be used by processors 970 and 980 in achieving operations and functionality outlined herein.

Processors 970 and 980 may be any type of processor, such as those discussed in connection with other figures. Processors 970 and 980 may exchange data via a point-to-point (PtP) interface 950 using point-to-point interface circuits 978 and 988, respectively. Processors 970 and 980 may each exchange data with an input/output (I/O) subsystem 990 via individual point-to-point interfaces 952 and 954 using point-to-point interface circuits 976, 986, 994, and 998. I/O subsystem 990 may also exchange data with a high-performance graphics circuit 938 via a high-performance graphics interface 939, using an interface circuit 992, which could be a PtP interface circuit. In one embodiment, the high-performance graphics circuit 938 is a special-purpose processor, such as, for example, a high-throughput MIC processor, a network or communication processor, compression engine, graphics processor, GPGPU, embedded processor, or the like. I/O subsystem 990 may also communicate with a display 933 for displaying data that is viewable by a human user. In alternative embodiments, any or all of the PtP links illustrated in FIG. 9 could be implemented as a multi-drop bus rather than a PtP link.

I/O subsystem 990 may be in communication with a bus 920 via an interface circuit 996. Bus 920 may have one or more devices that communicate over it, such as a bus bridge 918 and I/O devices 916. Via a bus 910, bus bridge 918 may be in communication with other devices such as a user interface 912 (such as a keyboard, mouse, touchscreen, or other input devices), communication devices 926 (such as modems, network interface devices, or other types of communication devices that may communicate through a computer network 960), audio I/O devices 914, and/or a data storage device 928. Data storage device 928 may store code and data 930, which may be executed by processors 970 and/or 980. In alternative embodiments, any portions of the bus architectures could be implemented with one or more PtP links.

Program code, such as code 930, may be applied to input instructions to perform the functions described herein and generate output information. The output information may be applied to one or more output devices, in known fashion. For purposes of this application, a processing system may be part of computing system 900 and includes any system that has a processor, such as, for example, a digital signal processor (DSP), a microcontroller, an application specific integrated circuit (ASIC), or a microprocessor.

The program code (e.g., 930) may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the one or more of the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the present disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

The computing system depicted in FIG. 9 is a schematic illustration of an embodiment of a computing system that may be utilized to implement various embodiments discussed herein. It will be appreciated that various components of the system depicted in FIG. 9 may be combined in a system-on-a-chip (SoC) architecture or in any other suitable configuration capable of achieving the functionality and features of examples and implementations provided herein.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 10:
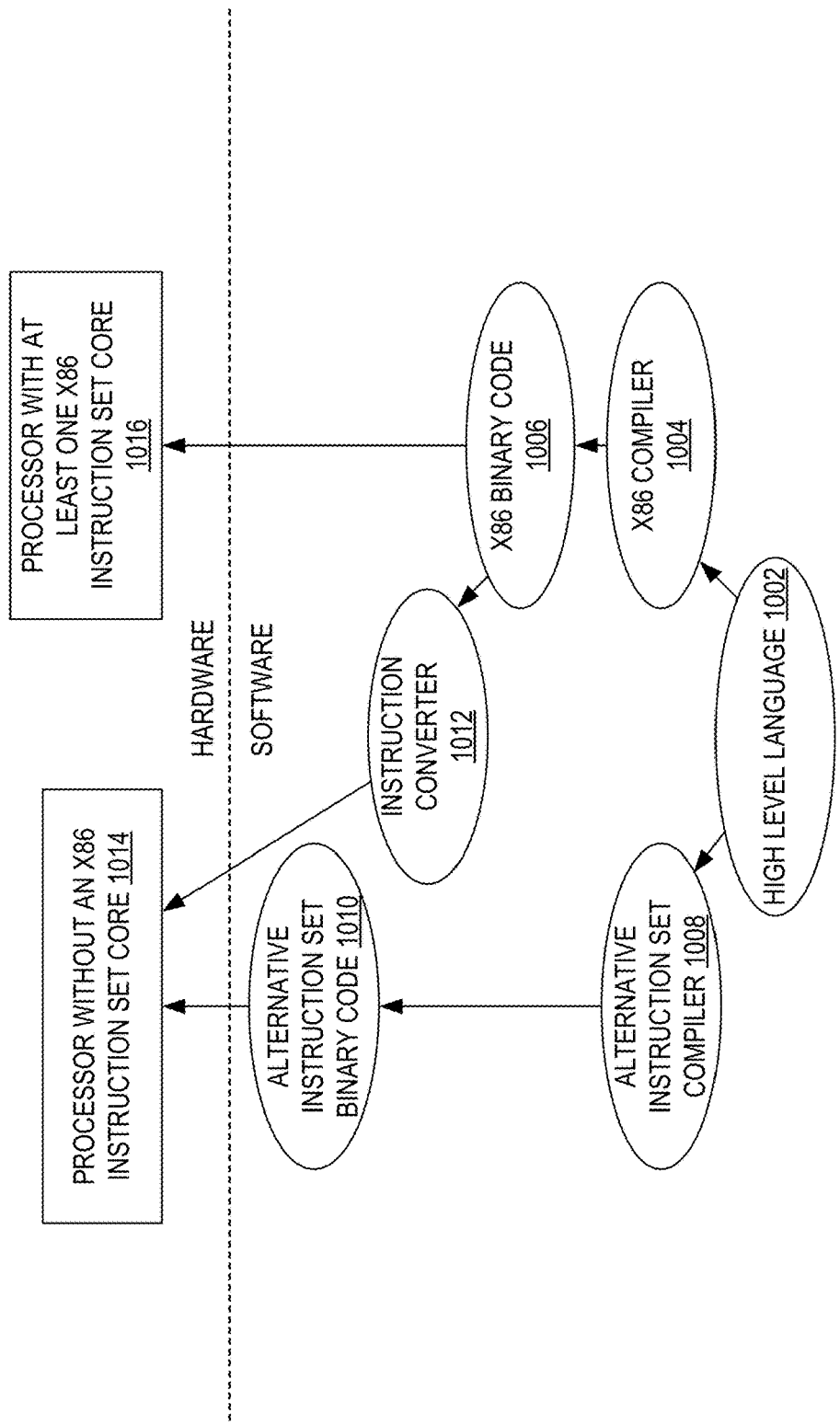
FIG. 10 is a block diagram contrasting the use of a software instruction converter to convert binary instructions in a source instruction set to binary instructions in a target instruction set according to embodiments of the present disclosure.

FIG. 10 is a block diagram contrasting the use of a software instruction converter to convert binary instructions in a source instruction set to binary instructions in a target instruction set according to embodiments of this disclosure. In the illustrated embodiment, the instruction converter is a software instruction converter, although alternatively the instruction converter may be implemented in software, firmware, hardware, or various combinations thereof. FIG. 10 shows a program in a high level language 1002 may be compiled using an x86 compiler 1004 to generate x86 binary code 1006 that may be natively executed by a processor with at least one x86 instruction set core 1016. The processor with at least one x86 instruction set core 1016 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1004 represents a compiler that is operable to generate x86 binary code 1006 (e.g., object code) that can, with or without additional linkage processing, be executed on the processor with at least one x86 instruction set core 1016. Similarly, FIG. 10 shows the program in the high level language 1002 may be compiled using an alternative instruction set compiler 1008 to generate alternative instruction set binary code 1010 that may be natively executed by a processor without at least one x86 instruction set core 1014 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1012 is used to convert the x86 binary code 1006 into code that may be natively executed by the processor without an x86 instruction set core 1014. This converted code is not likely to be the same as the alternative instruction set binary code 1010 because an instruction converter capable of this is difficult to make; however, the converted code will accomplish the general operation and be made up of instructions from the alternative instruction set. Thus, the instruction converter 1012 represents software, firmware, hardware, or a combination thereof that, through emulation, simulation or any other process, allows a processor or other electronic device that does not have an x86 instruction set processor or core to execute the x86 binary code 1006.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

The architectures presented herein are provided by way of example only, and are intended to be non-exclusive and non-limiting. Furthermore, the various parts disclosed are intended to be logical divisions only, and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

Note that with the examples provided herein, interaction may be described in terms of a single computing system. However, this has been done for purposes of clarity and example only. In certain cases, it may be easier to describe one or more of the functionalities of a given set of flows by only referencing a single computing system. Moreover, the system for deep learning and malware detection is readily scalable and can be implemented across a large number of components (e.g., multiple computing systems), as well as more complicated/sophisticated arrangements and configurations. Accordingly, the examples provided should not limit the scope or inhibit the broad teachings of the computing system as potentially applied to a myriad of other architectures.

As used herein, unless expressly stated to the contrary, use of the phrase at least one of refers to any combination of the named items, elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, the separation of various system components and modules in the embodiments described above should not be understood as requiring such separation in all embodiments. It should be understood that the described program components, modules, and systems can generally be integrated together in a single software product or packaged into multiple software products.

Thus, particular embodiments of the subject matter have been described. Other embodiments are within the scope of this disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Example 1 includes an apparatus comprising: a processor comprising: at least one core to execute instructions of a plurality of virtual machines (VMs) and a virtual machine monitor (VMM); and a cryptographic engine comprising circuitry to: protect data associated with the plurality of VMs through use of a plurality of private keys and a trusted transformer key, wherein each of the plurality of private keys are to protect program instructions and data of a respective VM and the trusted transformer key is to protect management structure data for the plurality of VMs; wherein the processor is to provide, to the VMM, read and write access to the management structure data through an untrusted transformer key.

Example 2 includes the subject matter of Example 1, wherein the processor is to, upon detecting that management structure data is protected using the untrusted transformer key, cause the VMM-written data to be decrypted by using the untrusted transformer key and encrypted using the trusted transformer key.

Example 2.5 includes the subject matter of Example 2, wherein the processor is further to validate the management structure data.

Example 3 includes the subject matter of Example 1 or 2, wherein the cryptographic engine is to: set a trusted domain (TD) bit for writes to the management structure data using a private key of the plurality of private keys or the trusted transformer key; and unset the TD bit for writes to the management structure data using the untrusted transformer key.

Example 4 includes the subject matter of any one of Examples 1-3, wherein the cryptographic engine is to: access management structure data in response to a read; return the accessed data to the core for reads using a private key of the plurality of private keys, the trusted transformer key, or the untrusted transformer key; return poisoned and zeroed data to the core for reads using other keys.

Example 5 includes the subject matter of Example 4, wherein the cryptographic engine is, before returning the accessed data to the core, to perform an integrity check on the accessed data based on the key used to access the data.

Example 6 includes the subject matter of any one of Examples 1-5, wherein the management structure data comprises page tables mapping guest physical addresses to physical addresses of a memory.

Example 7 includes the subject matter of any one of Examples 1-6, wherein the processor comprises a register to specify which key identifier of a key identifier space is an identifier of the transformer key.

Example 8 includes the subject matter of any one of Examples 1-7, further comprising a memory to store program instructions and data of the plurality of VMs encrypted using the private keys.

Example 9 includes the subject matter of any one of Examples 1-8, wherein the cryptographic engine is to encrypt the management structure data using one of the trusted transformer key or the untrusted transformer key.

Example 10 includes the subject matter of any one of Examples 1-9, wherein the cryptographic engine is to integrity protect the management structure data using one of the trusted transformer key or the untrusted transformer key.

Example 11 includes method comprising: executing instructions of a plurality of virtual machines (VMs) and a virtual machine monitor (VMM); protecting data associated with the plurality of VMs through use of a plurality of private keys and a trusted transformer key, wherein each of the plurality of private keys are to protect program instructions and data of a respective VM and the trusted transformer key is to protect management structure data for the plurality of VMs; providing, to the VMM, read and write access to the management structure data through an untrusted transformer key.

Example 12 includes the subject matter of Example 11, further comprising, in response to a request to read management structure data: detecting that the management structure data is protected using the untrusted transformer key; accessing the management structure data protected with the untrusted transformer key; decrypting the management structure data using the untrusted transformer key; and encrypting the management structure data using the trusted transformer key.

Example 13 includes the subject matter of Example 12, wherein detecting that the management structure data is protected using the untrusted transformer key is based on a trusted domain (TD) bit corresponding to the management structure data not being set.

Example 14 includes the subject matter of Example 13, further comprising setting the TD bit for the management structure data based on encrypting the management structure data using the trusted transformer key.

Example 15 includes the subject matter of any one of Examples 12-14, further comprising generating a message authentication code (MAC) for the management structure data based on the trusted transformer key.

Example 16 includes the subject matter of any one of Examples 11-15, wherein the management structure data comprises page tables mapping guest physical addresses to physical addresses of a memory.

Example 17 includes the subject matter of any one of Examples 11-16, wherein protecting the management structure data using the trusted transformer key comprises encrypting the management structure data based on the trusted transformer key.

Example 18 includes the subject matter of any one of Examples 11-17, wherein protecting the management structure data using the trusted transformer key comprises integrity protecting the management structure data based on the trusted transformer key.

Example 19 includes one or more non-transitory computer-readable media comprising code stored thereon, wherein the code is executable to cause a machine to: protect data associated with a plurality of VMs through use of a plurality of private keys and a trusted transformer key, wherein each of the plurality of private keys are to protect program instructions and data of a respective VM and the trusted transformer key is to protect management structure data for the plurality of VMs; and provide, to a virtual machine monitor (VMM), read and write access to the management structure data through an untrusted transformer key.

Example 20 includes the subject matter of Example 19, wherein the code is to cause the machine, in response to a request to read management structure data: detect that the management structure data is protected using the untrusted transformer key; access the management structure data protected with the untrusted transformer key; decrypt the management structure data using the untrusted transformer key; and encrypt the management structure data using the trusted transformer key.

Example 21 includes the subject matter of Example 20, wherein the code is to cause the machine to detect that the management structure data is protected using the untrusted transformer key based on a trusted domain (TD) bit corresponding to the management structure data not being set.

Example 22 includes the subject matter of Example 21, wherein the code is to cause the machine to set the TD bit for the management structure data based on encrypting the management structure data using the trusted transformer key.

Example 23 includes the subject matter of any one of Examples 19-22, wherein the management structure data comprises page tables mapping guest physical addresses to physical addresses of a memory.

Example 24 includes the subject matter of any one of Examples 19-23, wherein protecting the management structure data using the trusted transformer key comprises encrypting the management structure data based on the trusted transformer key.

Example 25 includes the subject matter of any one of Examples 19-24, wherein protecting the management structure data using the trusted transformer key comprises integrity protecting the management structure data based on the trusted transformer key.

Example 26 includes a system comprising: means for executing instructions of a plurality of virtual machines (VMs) and a virtual machine monitor (VMM); means for protecting data associated with the plurality of VMs through use of a plurality of private keys and a trusted transformer key, wherein each of the plurality of private keys are to protect program instructions and data of a respective VM and the trusted transformer key is to protect management structure data for the plurality of VMs; and means for providing, to the VMM, read and write access to the management structure data through an untrusted transformer key.

Example 27 includes the subject matter of Example 26, wherein the means for protecting the management structure data comprise means for: detecting that the management structure data is protected using the untrusted transformer key based on a trusted domain (TD) bit not being set; accessing the management structure data protected with the untrusted transformer key; decrypting the management structure data using the untrusted transformer key; and encrypting the management structure data using the trusted transformer key.

Example 28 includes the subject matter of Example 27, wherein the means for protecting the management structure data further comprise means for setting the TD bit for the management structure data based on encrypting the management structure data using the trusted transformer key.

Example 29 includes the subject matter of any one of Examples 26-28, wherein the means for protecting the management structure data using the trusted transformer key comprises means for encrypting the management structure data based on the trusted transformer key.

Example 30 includes the subject matter of any one of Examples 26-29, wherein the means for protecting the management structure data using the trusted transformer key comprises means for integrity protecting the management structure data based on the trusted transformer key.

What is claimed is:

1. An apparatus comprising:
   a processor comprising:
   at least one core to execute instructions of a plurality of virtual machines (VMs) and a virtual machine monitor (VMM); and
   a cryptographic engine comprising circuitry to protect data associated with the plurality of VMs through use of a plurality of private keys and a trusted transformer key, wherein each of the plurality of private keys are to protect program instructions and data of a respective VM and the trusted transformer key is to protect management structure data for the plurality of VMs;
   wherein the processor is to provide, to the VMM, read and write access to the management structure data through an untrusted transformer key and, upon detecting that VMM-written management structure data is protected using the untrusted transformer key, cause the VMM-written management structure data to be decrypted by using the untrusted transformer key and encrypted using the trusted transformer key.

2. The apparatus of claim 1, wherein the processor is further to validate the management structure data prior to encrypting the management structure data using the trusted transformer key.

3. The apparatus of claim 1, wherein the cryptographic engine is to:
   set a trusted domain (TD) bit for writes to the management structure data using a private key of the plurality of private keys or the trusted transformer key; and
   unset the TD bit for writes to the management structure data using the untrusted transformer key.

4. The apparatus of claim 1, wherein the cryptographic engine is to:
   access management structure data in response to a read;
   return the accessed data to the core for reads using a private key of the plurality of private keys, the trusted transformer key, or the untrusted transformer key; and
   return poisoned and zeroed data to the core for reads using other keys.

5. The apparatus of claim 4, wherein the cryptographic engine is, before returning the accessed data to the core, to perform an integrity check on the accessed data based on the key used to access the data.

6. The apparatus of claim 1, wherein the management structure data comprises page tables mapping guest physical addresses to physical addresses of a memory.

7. The apparatus of claim 1, further comprising a memory to store program instructions and data of the plurality of VMs encrypted using the private keys.

8. The apparatus of claim 1, wherein the cryptographic engine is to encrypt the management structure data using one of the trusted transformer key or the untrusted transformer key.

9. The apparatus of claim 1, wherein the cryptographic engine is to integrity protect the management structure data using one of the trusted transformer key or the untrusted transformer key.

10. A method comprising:
    executing, by a processor, instructions of a plurality of virtual machines (VMs) and a virtual machine monitor (VMM);
    protecting data associated with the plurality of VMs through use of a plurality of private keys and a trusted transformer key, wherein each of the plurality of private keys are to protect program instructions and data of a respective VM and the trusted transformer key is to protect management structure data for the plurality of VMs;
    providing, to the VMM, read and write access to the management structure data through an untrusted transformer key;
    detecting, in response to a request to read management structure data, that the management structure data is protected using the untrusted transformer key;
    accessing the management structure data protected with the untrusted transformer key;
    decrypting the management structure data using the untrusted transformer key; and
    encrypting the management structure data using the trusted transformer key.

11. The method of claim 10, wherein detecting that the management structure data is protected using the untrusted transformer key is based on a trusted domain (TD) bit corresponding to the management structure data not being set.

12. The method of claim 11, further comprising setting the TD bit for the management structure data based on encrypting the management structure data using the trusted transformer key.

13. The method of claim 10, further comprising generating a message authentication code (MAC) for the management structure data based on the trusted transformer key.

14. The method of claim 10, wherein the management structure data comprises page tables mapping guest physical addresses to physical addresses of a memory.

15. The method of claim 10, wherein protecting the management structure data using the trusted transformer key comprises encrypting the management structure data based on the trusted transformer key.

16. The method of claim 10, wherein protecting the management structure data using the trusted transformer key comprises integrity protecting the management structure data based on the trusted transformer key.

17. One or more non-transitory computer-readable media comprising code stored thereon, wherein the code is executable to cause a machine to:
    protect data associated with a plurality of VMs through use of a plurality of private keys and a trusted transformer key, wherein each of the plurality of private keys are to protect program instructions and data of a respective VM and the trusted transformer key is to protect management structure data for the plurality of VMs;
    provide, to a virtual machine monitor (VMM), read and write access to the management structure data through an untrusted transformer key;
    detect, in response to a request to read management structure data, that the management structure data is protected using the untrusted transformer key;
    access the management structure data protected with the untrusted transformer key;
    decrypt the management structure data using the untrusted transformer key; and
    encrypt the management structure data using the trusted transformer key.

18. The one or more computer-readable media of claim 17, wherein the code is to cause the machine to detect that the management structure data is protected using the untrusted transformer key based on a trusted domain (TD) bit corresponding to the management structure data not being set.

19. The one or more computer-readable media of claim 18, wherein the code is to cause the machine to set the TD bit for the management structure data based on encrypting the management structure data using the trusted transformer key.

20. The one or more computer-readable media of claim 17, wherein the management structure data comprises page tables mapping guest physical addresses to physical addresses of a memory.

21. The one or more computer-readable media of claim 17, wherein protecting the management structure data using the trusted transformer key comprises encrypting the management structure data based on the trusted transformer key.

22. The one or more computer-readable media of claim 17, wherein protecting the management structure data using the trusted transformer key comprises integrity protecting the management structure data based on the trusted transformer key.

* * * * *